United States Patent [19]

Glienicke

[11] 4,315,660

[45] Feb. 16, 1982

[54] AERODYNAMIC MULTIPLE-WEDGE RESILIENT BEARING

[75] Inventor: Joachim Glienicke, Karlsruhe, Fed. Rep. of Germany

[73] Assignee: Tmaschinen Forschungsvereinigung Verbrennungskra Maschinen, Frankfurt, Fed. Rep. of Germany

[21] Appl. No.: 129,007

[22] Filed: Mar. 10, 1980

[30] Foreign Application Priority Data

Mar. 14, 1979 [DE] Fed. Rep. of Germany ....... 2909973

[51] Int. Cl.³ .............................................. F16C 32/06
[52] U.S. Cl. .................................. 308/9; 308/DIG. 1
[58] Field of Search ..................... 308/9, 73, 121, 122, 308/DIG. 1, 160

[56] References Cited

U.S. PATENT DOCUMENTS

| 3,382,014 | 5/1968 | Marley | 308/9 |
| 3,635,534 | 1/1972 | Barnett | 308/121 |
| 3,747,997 | 7/1973 | Winn | 308/9 |
| 3,809,443 | 5/1974 | Cheribim | 308/9 |
| 4,082,375 | 4/1978 | Fortmann | 308/9 |
| 4,208,076 | 6/1980 | Grey et al. | 308/9 |
| 4,225,196 | 9/1980 | Grey | 308/9 |
| 4,247,155 | 1/1981 | Fortmann | 308/9 |

FOREIGN PATENT DOCUMENTS 1447651 8/1976 United Kingdom .

Primary Examiner—Stuart S. Levy
Attorney, Agent, or Firm—Sprung, Felfe, Horn, Lynch & Kramer

[57] ABSTRACT

An aerodynamic multiple wedge resilient bearing includes two bearing members which are movable relative to each other and a resilient supporting and damping assembly mounted on one of the bearing members and forming a lubricant clearance with the other bearing member which has a plurality of wedgelike constrictions. The resilient supporting and damping assembly includes a plurality of ribs connecting one bearing member to one foil and a plurality of ribs connecting the two foils, wherein the ribs are disposed alternately and perpendicular to the direction of the relative movement of the two bearing members.

8 Claims, 2 Drawing Figures

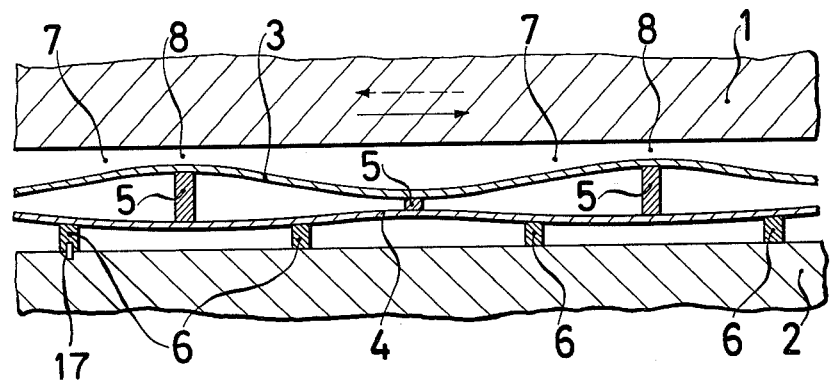
FIG.1
FIG.2
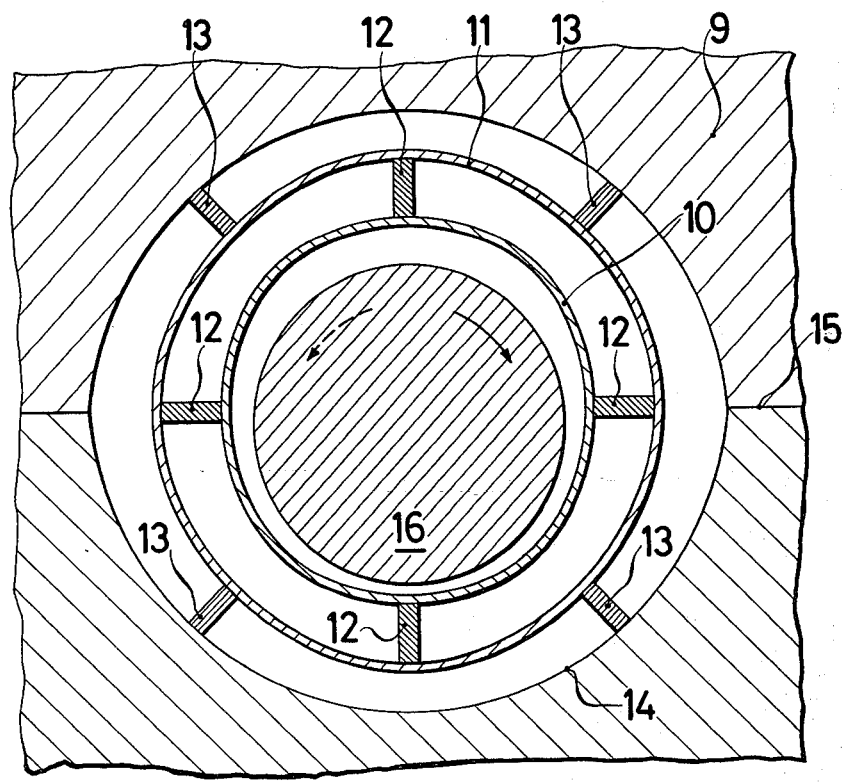

AERODYNAMIC MULTIPLE-WEDGE RESILIENT BEARING

BACKGROUND OF THE INVENTION

The invention relates to an aerodynamic multiplewedge resilient bearing comprising two bearing halves which slide relative to each other as well as a resilient supporting and damping assembly which is secured to one bearing half and is formed of thin, elastic foils.

Aerodynamic bearings use air or other gases as a lubricant. The pressure in the lubrication clearance which provides the carrying capacity of the bearing is produced automatically, in much the same manner as in hydrodynamic bearings, by the sliding motion of the bearing surfaces in lubrication-clearance regions which converge in a wedgelike manner, and hence the name carrying wedge or lubrication wedge. A plurality of lubrication wedges over the circumference of the bearing will result in improved guiding and stability of the bearing.

The low viscosity of gases makes possible considerably higher sliding speeds than liquid-lubricated bearings will allow. At the same time the power dissipation in the bearing is reduced. Gases retain their lubricating properties over wide temperature ranges, from very low to very high temperatures. Moreover, with an aerodynamic bearing there are no sealing problems since it draws its lubricant from the working medium. This is why aerodynamic bearings can be used under extreme operating conditions, with extremely high circumferential speeds, and at both extremely low and extremely high operating temperatures. Applications include rapidly rotating shafts of any kind, such as in small gas turbines and exhaustgas turbosuperchargers and in other small turboengines.

In aerodynamic resilient bearings, one bearing half is provided with a resilient supporting and damping assembly consisting of thin elastic foils which form the bearing surface of this bearing half. This assembly yields to accommodate thermal expansion of the other bearing half so that an adequate lubrication-clearance height is maintained. The assembly also serves to dampen shaft vibrations which at specific critical speeds of rotation occur as resonant oscillations and, above a stability-limiting speed of rotation, as self-excited oscillations.

In a prior art radial bearing of this type, as disclosed in U.S. Pat. No. 3,747,997, the circular housing of the bearing is lined with a corrugated, pliant strip. Disposed thereon as the bearing surface is a straight, thin, pliant strip. This spring bearing is supported very softly and provided but little damping. Given the overall circular cross section of the bearing surface, this bearing does not constitute a multiplewedge bearing, and it is therefore able to transmit self-excited oscillations even at relatively low speeds of rotation.

Another known resilient bearing disclosed in British Patent Specification No. 1,447,651, uses a plurality of foils which at one end are fastened to the associated bearing half and whose other end overlaps the adjacent foil. The free ends of the foils in combination form the bearing surface. This bearing has better damping, however, the foils are elastically prestressed relative to the bearing surface of the other bearing half. This results in high starting friction and wear until the aerodynamic lubrication wedge is formed.

SUMMARY OF THE INVENTION

The object of the invention is to overcome these drawbacks of prior-art bearings and, in particular, to improve the overall damping characteristics of the bearing and reduce the starting friction.

This object is accomplished by means of two superposed continuous foils, one of which forms the bearing surface and is supported by means of ribs on the second foil, which in turn is supported by ribs on the associated bearing half, the ribs of one foil being disposed between the ribs of the other foil, all ribs being disposed perpendicularly to the direction of motion, and the foil forming the bearing surface being constrained in such a way that the lubrication clearance is repeatedly constricted in a wedgelike manner over the circumference of the bearing.

This foil arrangement results in a multiple-wedge resilient bearing which in operation adjusts even to marked elastic and thermal deformations of the other bearing half automatically through elastic deformations of the foils. The overall damping of the bearing is enhanced by the cushioning and damping support of the bearing shell and the gas-filled clearance space in back of the foils. In this way the stability of the bearing is improved and the stability limit is moved up in the direction of higher speeds of rotation. Since the foils are not elastically prestressed relative to the bearing surface of the other bearing half, bearing friction during starting as well as wear are substantially reduced. As a result, the requirements to be met by the wear resistance and sliding properties of the foil material are less stringent. This allows greater latitude in the selection of the bearing materials. Moreover, this resilient bearing is suitable for rotation in either direction.

In a radial bearing, the invention is embodied in that the two foils form two concentric, thin-walled elastic sleeves which are set into the bore of the housing, the inner sleeve having an overall cross section which departs from the form of a circle. As a result, the lubrication clearance between this sleeve and the circular journal is repeatedly constricted in a wedgelike manner over the circumference of the bearing. For example, the overall cross section may be formed of a plurality of arcs of a circle whose radius is greater than the greatest radius of the sleeve.

Sleeves of circular cross section may also be used which in the bore of the housing are elastically deformed to a cross section deviating from the form of a circle. This may be done in various ways, for example, by appropriate disposition and/or dimensioning of the ribs, or by splitting the housing of the bearing and leaving a gap between the two halves. In this case, the clamping of the resilient supporting and damping assembly consisting of springlike elements and ribs in the housing can also serve to anchor it.

The resilient supporting and damping assembly may also be secured in the housing by interlocking with it, e.g. by a lug or a pin.

What applies to a radial bearing also applies to a conical bearing, except, of course, that the bearing surfaces extend, not cylindrically but conically.

In an axial bearing, the foil forming the bearing surface is run over the ribs in an undulating manner, with the result that a plurality of wedgelike constrictions of the lubrication clearance are created over the circumference of the bearing between the foil and the level bearing surface of the other bearing half.

The foil forming the bearing surface may be slit at one or more points over the circumference perpendicularly to the direction of motion. This will enhance its capability of adapting itself to elastic and thermal deformations of the other bearing half.

BRIEF DESCRIPTION OF THE DRAWINGS

The invention will now be explained in greater detail with reference to the drawings illustrating embodiments thereof, wherein:

FIG. 1 is a diagrammatic representation of the resilient bearing arrangement of the invention; and FIG. 2 is a cross-sectional view through a radial bearing according to the invention.

DETAILED DESCRIPTION OF THE INVENTION

In FIG. 1, the bearing half 1 is moved in the directions of the arrows relative to the bearing half 2. The resilient supporting and damping assembly formed by two superposed foils 3 and 4 is fixed to the bearing half 2 by means of ribs 5 and 6. The lower foil 4 serves as a cushioning and damping bearing-surface support. It is secured to the bearing half 2 by ribs 6. The upper foil 3 forms the bearing surface as such. It is joined to the supporting foil 4 by means of ribs 5, which are disposed between the ribs 6. The foil 3 is constrained in such a way that the lubrication clearance 7 between foil 3 and the other bearing half 1 is repeatedly constricted in a wedgelike manner, as at 8, over the circumference of the bearing. This is accomplished here through the dimensioning of the ribs 5. This is the way in which the resilient supporting and damping assembly may be constructed in the case of an axial bearing, for example, in which two level bearing surfaces confront each other. The ribs 5 and 6 extend perpendicularly to the direction of motion, that is to say, radially in the case of an axial bearing.

FIG. 2 is a cross-sectional view through a radial bearing comprising a resilient supporting and damping assembly in accordance with the invention. Disposed in the housing 9 of the bearing are two concentric thin-walled elastic sleeves 10 and 11. The inner sleeve 10 serves as the bearing shell as such. It is supported by means of ribs 12 on the outer sleeve 11, which in turn is supported through ribs 13 on the inside wall of the bore 14 of the housing. The ribs 12 are disposed between the ribs 13. All ribs extend perpendicularly to the direction of motion, that is to say, axially in the case of this radial bearing. The outer sleeve 11 thus provides a resilient and damping support for the inner sleeve 10. The originally circular cross section has been deformed in the mounting of the resilient supporting and damping assembly in the bore 14 of the housing so that four wedge-like constrictions were produced over the circumference of the bearing in the lubrication clearance between the sleeve 10 and the circular journal 16. To permit deformation of the resilient supporting and damping assembly, the bore 14 of the housing was given a lemon-like overall cross section. This was done in known manner by lathing the bore with a spacer in the joint 15 and then removing the spacer.

The resilient supporting and damping assembly of FIGS. 1 and 2 may be secured in the housing by interlocking with it, e.g. by a conventional bug or pin as represented at 17 in FIG. 1.

It will be appreciated that the instant specification and claims are set forth by way of illustration and not limitation and that various modifications and changes may be made without departing from the spirit and scope of the present invention.

What is claimed is:

1. An aerodynamic multiple wedge resilient bearing comprising: two bearing members; and means for resiliently supporting the two bearing members for movement relative to each other and for damping the relative movement of the bearing members comprising two superposed continuous foils and means mounting the superposed foils to one bearing member to form a clearance between the surface of the other bearing member and a bearing surface of one foil having a plurality of wedgelike constrictions and receptive of a gaseous lubricant therein, the mounting means including a plurality of spaced apart first ribs connecting the one bearing member to the other foil and a plurality of spaced apart second ribs connecting the two foils, wherein the first and second ribs are disposed alternately and perpendicular to the direction of the relative movement of the two bearing members to produce said wedgelike constrictions.

2. A bearing according to claim 1, wherein the bearing is a radial bearing and the bearing members comprise a housing having a bore and a journal and the two foils comprise two concentric thin-walled elastic sleeves set into the bore of the housing the means mounting the foils effecting the inner one of these sleeves having an overall cross section which deviates from the form of a circle.

3. A bearing according to claim 2, wherein the sleeves are cylindrical and wherein the mounting means elastically deforms same to a cross section deviating from the form of a circle.

4. A bearing according to claim 3, wherein the mounting means effects a clamping connection of the foils to the bore of the housing in a deformed configuration.

5. A bearing according to claim 2, further comprising interlocking means securing the damping means in the bore of the housing by interlocking therewith.

6. A bearing according to claim 2, wherein the cross section of the bore deviates from the form of a circle.

7. A bearing according to claim 5, wherein the interlocking means comprises a lug.

8. A bearing according to claim 5, wherein the interlocking means comprises a pin.

* * * * *

UNITED STATES PATENT AND TRADEMARK OFFICE
CERTIFICATE OF CORRECTION

PATENT NO. : 4,315,660
DATED : Feb. 16, 1982
INVENTOR(S) : Joachim Glienicke

It is certified that error appears in the above—identified patent and that said Letters Patent is hereby corrected as shown below:

Title Page   Delete assignee name and insert
Assignee     --Forschungsvereinigung Verbrennungskraft-
               maschinen e.v. --.

Signed and Sealed this

Sixth Day of July 1982

[SEAL]

Attest:

GERALD J. MOSSINGHOFF

Attesting Officer   Commissioner of Patents and Trademarks